Nov. 23, 1926.
F. BERGIUS
1,607,939
PROCESS FOR HYDROGENATING AND CRACKING HYDROCARBONS, CARBONACEOUS MATTERS, AND THE LIKE
Filed April 5, 1924
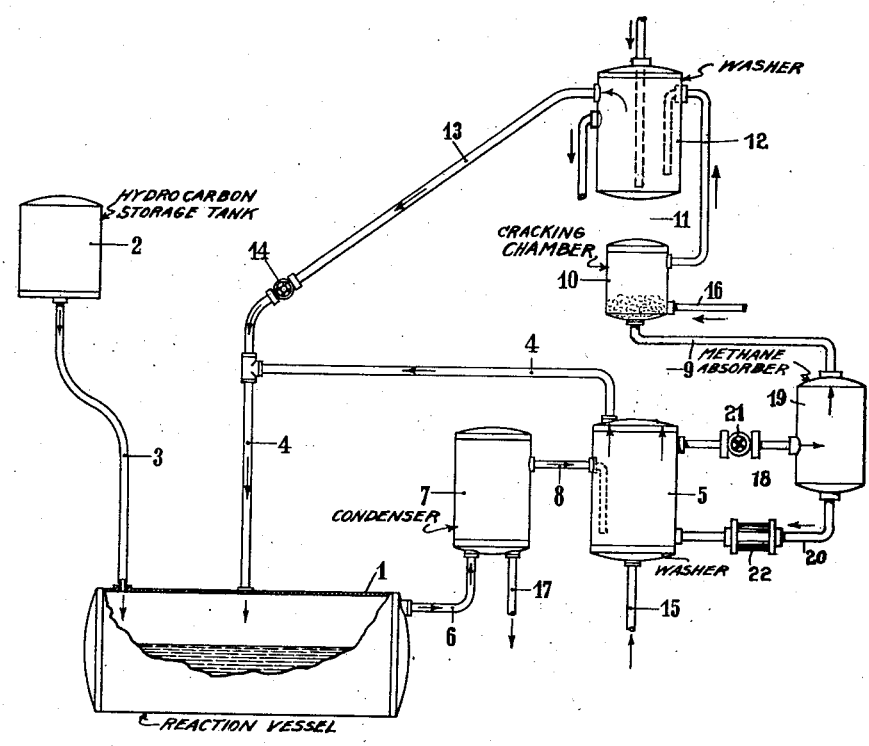
Inventor:
Friedrich Bergius
by Byrnes Townsend & Brickenstein
attys.

Patented Nov. 23, 1926.

1,607,939

UNITED STATES PATENT OFFICE.

FRIEDRICH BERGIUS, OF HEIDELBERG, GERMANY.

PROCESS FOR HYDROGENATING AND CRACKING HYDROCARBONS, CARBONACEOUS MATTERS, AND THE LIKE.

Application filed April 5, 1924, Serial No. 704,433, and in Germany May 31, 1923.

The invention consists in a process for hydrogenating and cracking hydrocarbons and carbonaceous matters under heat and pressure and its object is to reduce the costs of manufacture which are caused by the consumption of hydrogen.

When hydrogenating and cracking the raw materials, from the reaction vessel with the products of distillation (gasoline, petrol etc.) that part of the introduced hydrogen escapes which has not been consumed and is mixed with the carbon containing gases resulting from the reaction, especially methane and ethane.

The escaping gas mixture cannot serve for the hydrogenating without special treatment, because its amount of hydrogen is too low. The invention renders it possible to use the hydrogenating gas in a continuous circulating process, the hydrogenating gas being enriched with hydrogen over and over again.

For this purpose the escaping gas mixture, after the fluid distillation products have been condensed, are conducted into a washer where the gas mixture is washed with mineral oils and tar oils under high pressure e. g. under 100 atm. The hydrocarbons mixed therewith are dissolved when highly compressed in the mentioned oils in a proportion which is thrice larger than for hydrogen. The gas enriched with hydrogen is then adapted for the hydrogenating and returned into the reaction vessel. In order to renew the hydrogen used in the hydrogenating fully or at least to a large extent, the invention makes use of the hydrocarbon gases remaining in the washing oil. These gases are expelled either by allowing them to expand or by heating the wash oil, whereby the wash oil is enabled to be used over again, whereas the methane etc. is decomposed into carbon and hydrogen by cracking that is to say by heating at high temperature in a known manner. From the cracking vessel hydrogen then escapes again which is likewise returned into the cycle, after, if necessary, having been released from the methane by washing it under high pressure in the same manner as described above for the waste gases directly escaping from the reaction vessel.

If then an addition of hydrogen is still necessary, and furthermore for starting the plant where waste gases from the reaction vessel are not at disposal, other hydrogen containing gases, such as coke oven gases, illuminating gas etc. may be used which are introduced into the washer for enriching with hydrogen or into the cracking vessel for decomposing methane, ethylene etc.

For carrying out the invention a plant is used which is diagrammatically represented in the drawing.

1 is the reaction or high pressure vessel which is supplied with the hydrocarbon to be treated from vessel 2 by means of the conduit 3. To the reaction vessel 1 is connected the conduit 4 for introducing hydrogen, such conduit being connected to the washer 5. The gas mixture prepared in the reaction vessel 1 passes through conduit 6 into the condenser 7 which is connected by conduit 8 to the washer 5. To the washer 5 is connected, by conduit 18 having a valve 21, the vessel 19 where the methane is expelled by heating or by reduction of pressure. The vessel 19 is connected to the washer 5 by conduit 20 having a pump 22 through which the washing liquid is returned to the washer 5. This part of the apparatus operates intermittently. The valve 21 is opened and the pressure existing in vessel 5 forces the saturated washing liquid into the vessel 19. As soon as this vessel has been filled, the valve 21 is closed and the absorbed methane is expelled. After the methane has been expelled the pump 22 is started and the washing liquid is forced back into the washer 5. The cracker 10 is connected to the vessel 19 by conduit 9 and, if necessary, is connected by conduit 11 to another washer 12, which is similar to the washer 5; the washer 12 is connected by conduit 13 to the first hydrogen conduit 4, the conduit 13 containing a valve 14. The conduit 15 serves for introducing waste gases such as coke oven gas, if necessary, into the washer 5, the conduit 16 serves for introducing the same gases into the cracker 10.

The operation is as follows:

The gas mixture escaping into the condenser 7 from the reaction vessel 1 through conduit 6 is freed within the condenser from the distillation products which run off through conduit 17. The mixture of hydrogen and methane enters through conduit 8 into the washer 5 which is filled with washing liquid (mineral oils, tar oils) under pressure. In this washer the gas mixture is freed from methane, hydrogen escapes through the conduit 4 into the reaction vessel 1 whereas the wash oil containing methane passes through conduit 18 into the vessel 19 where the methane is expelled by heating and escapes through conduit 9 into the cracker 10, where it is decomposed into carbon and hydrogen by heating in a known manner. The washing liquid returns through conduit 20 into the washer 5. The hydrogen escaping through tube 11 is, if necessary, freed from undecomposed methane in the washer 12 and is united by means of the conduit 13 with the hydrogen streaming through the conduit 4. Washing liquid is introduced through pipe 23 and the saturated wash liquor removed through pipe 24. Coke oven gases, if necessary, are added to the washer 5 by means of the conduit 15 and to the cracker 10 by means of the conduit 16.

What I claim is:

1. Process for hydrogenating and cracking hydrocarbons, carbonaceous matters and the like, consisting in introducing hydrogen into the vapors produced in a reaction vessel, passing the mixed gases and vapors through a condenser, washing under high pressure the uncondensed gases with wash oil, returning the hydrogen-containing gases to the reaction vessel, removing absorbed hydrocarbon gas from the wash oil, heating such gas at high temperature to decompose it into carbon and hydrogen, and introducing the thus produced hydrogen into the reaction vessel.

2. Process for hydrogenating and cracking hydrocarbons, carbonaceous matters and the like, consisting in introducing hydrogen into the vapors produced in a reaction vessel, passing the mixed gases and vapors through a condenser, washing under high pressure the uncondensed gases with wash oil, returning the hydrogen-containing gases to the reaction vessel, removing absorbed hydrocarbon gas from the wash oil, heating such gas at high temperature to decompose it into carbon and hydrogen, introducing the thus produced hydrogen into the reaction vessel, and adding other hydrogen-containing gases during the cracking operation.

3. Process as claimed in claim 1 which consists in introducing hydrogen-containing gases into the wash oil.

In testimony whereof, I affix my signature.

Dr. FRIEDRICH BERGIUS